(12) United States Patent
Da Dalt et al.

(10) Patent No.: US 9,596,038 B2
(45) Date of Patent: Mar. 14, 2017

(54) RANDOM SPREAD SPECTRUM MODULATION

(75) Inventors: Nicola Da Dalt, Sattendorf (AT); Peter Pridnig, Arnoldstein (AT); Werner Grollitsch, Villach (AT)

(73) Assignee: Infineon Technologies AG, Neubiberg (DE)

( * ) Notice: Subject to any disclaimer, the term of this patent is extended or adjusted under 35 U.S.C. 154(b) by 169 days.

(21) Appl. No.: 13/422,605

(22) Filed: Mar. 16, 2012

(65) Prior Publication Data
US 2013/0241600 A1   Sep. 19, 2013

(51) Int. Cl.
*H03B 21/00* (2006.01)
*H04B 15/04* (2006.01)
*H04B 1/707* (2011.01)

(52) U.S. Cl.
CPC ............. *H04B 15/04* (2013.01); *H04B 1/707* (2013.01)

(58) Field of Classification Search
CPC ... H03L 2207/50; H03L 7/0991; H03L 7/091; H03L 7/093; H03L 2207/06
USPC ............... 327/105–107, 147–150, 155–159; 331/1 A, 16, 35, 177 R
See application file for complete search history.

(56) References Cited

U.S. PATENT DOCUMENTS

| | | | | |
|---|---|---|---|---|
| 6,014,445 | A  * | 1/2000 | Kohda et al. | 380/28 |
| 7,358,820 | B2 * | 4/2008 | Da Dalt | 331/16 |
| 7,634,752 | B2 * | 12/2009 | Iotov et al. | 716/138 |
| 7,814,212 | B1 * | 10/2010 | Chan | 709/227 |
| 2010/0074445 | A1 * | 3/2010 | Nefedov et al. | 380/263 |

* cited by examiner

*Primary Examiner* — Diana J Cheng
(74) *Attorney, Agent, or Firm* — Shumaker & Sieffert, P.A.

(57) ABSTRACT

Representative implementations of devices and techniques provide a spread spectrum clocking signal. In a frequency synthesizer, a sequence of values may be generated and used to modulate a frequency of an input signal to the frequency synthesizer.

25 Claims, 5 Drawing Sheets

RANDOM SPREAD SPECTRUM MODULATION

BACKGROUND

Typically, a clocking signal used in a digital core is delivered by an on-chip clock generation unit or frequency synthesizer. The clock generation unit may be a Phase Locked Loop (PLL) device, which could also be implemented in the form of a digital PLL. However, such clocking signals may be a source of electromagnetic interference (EMI) to other portions of a system utilizing the digital core. Undesirable electromagnetic energy may propagate throughout the system, or to the external environment, and cause adverse effects to other susceptible devices.

Electromagnetic compatibility (EMC) requirements in various industries, such as the automotive and consumer electronics industries, for example, put stringent limits on the emission of electromagnetic radiation of electronic devices. Accordingly, spread spectrum clocks have been developed for use in digital cores that spread the electromagnetic energy over a wide frequency spectrum, thereby reducing the magnitude of energy at or near a given frequency. A spread spectrum clock may be produced by modulating the output frequency of a PLL, for example, with a periodic low-frequency pattern (e.g., triangular pattern, sinusoidal pattern, cubic pattern a.k.a. "Hershey-Kiss," etc.). The periodic low-frequency modulation "spreads" the energy of the clock signal over a wider bandwidth, effectively reducing the peak spectrum electromagnetic emission.

Low frequency up-spread modulation, where the modulation profile is above the nominal frequency of the un-modulated clocking signal, is generally used for safety critical applications, such as automotive applications. In such applications it is important that the digital core delivers a minimum guaranteed frequency to the system, in case any emergency procedure has to be taken automatically by the system. However, when using up-spread modulation, the digital core must be constrained for a higher maximum frequency, with resulting power and area costs. For example, if the nominal (un-modulated) frequency is 300 MHz, and the up-spread spread spectrum has a peak-peak value of 5%, the maximum frequency in the system grows to 315 MHz. The digital core must be constrained to this frequency, leading to higher power and area consumption. Additionally, low frequency up-spread modulation may introduce an accumulation of phase over time, which can lead to problems in the operation of synchronous data interfaces between the digital core and other un-modulated cores.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Representative implementations of devices and techniques provide a spread spectrum clocking signal. In a frequency synthesizer, such as a phase lock loop (PLL) device, a clocking signal is generated based on an input signal. A sequence of values may be generated and used to modulate an output signal of the frequency synthesizer, resulting in the spread spectrum clocking signal. In various implementations, the sequence of values may be a sequence of random or pseudo-random values. In alternate implementations, one or more sequences of values may be added to the signal path of the frequency synthesizer at one or more points along the signal path.

In various implementations, the sequence of values modulates the output signal of the frequency synthesizer at a high modulation frequency, in the MHz range for example. In other implementations, the modulation profile, and thus the spread spectrum clocking signal, is centered about a nominal frequency of the clocking signal generated at the frequency synthesizer. Alternately, the sequence of values may be tracked, and subsequent sequences of values generated based on previous sequences of values.

Various implementations of spread spectrum clocking signal generation for a frequency synthesizer are discussed in this disclosure. Techniques and devices of spread spectrum modulation are discussed with reference to example PLL device block diagrams illustrated in the figures. However, the techniques and devices discussed may be applied to any of various frequency synthesizer designs, circuits, and devices and remain within the scope of the disclosure. Further, the techniques and devices discussed herein are referred to in the environment of a digital PLL device for ease of discussion and illustrative convenience. The techniques and/or devices may also be used in other implementations, circuits, systems, and the like, including digital, analog, or mixed signal systems, to generate a spread spectrum clocking signal.

Advantages of the disclosed techniques and devices are varied, and include: 1) improved minimum guaranteed frequency for reduced reaction time during critical safety issues; 2) reduced phase accumulation, thus improving the interoperability of synchronous interfaces with external systems; 3) better spread of the emission spectrum, allowing a lower peak-peak modulation value to be used; 4) reduced maximum frequency for which the digital core must be synthesized; and 5) power and area advantages in the digital core. Other advantages of the disclosed techniques may also be present.

Implementations are explained in more detail below using a plurality of examples. Although various implementations and examples are discussed here and below, further implementations and examples may be possible by combining the features and elements of individual implementations and examples.

Example PLL Device Arrangement

Figure 1:
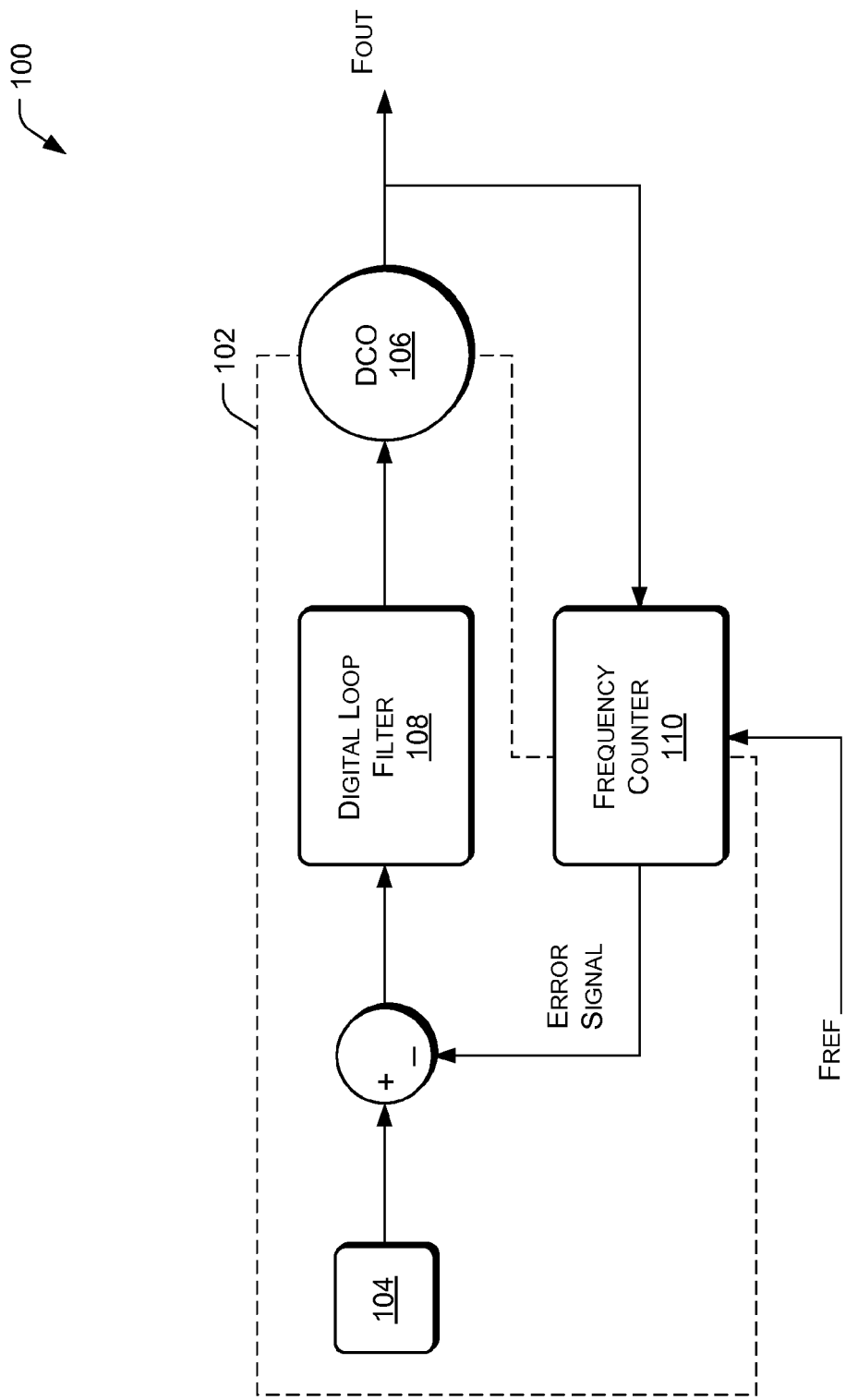
FIG. 1 is a block diagram of an example phase locked loop (PLL) device, according to an implementation.

FIG. 1 is a block diagram of an example phase locked loop (PLL) device 100, according to an implementation. It is to be understood that frequency synthesizer arrangements (hereafter referred to as "PLL device") may be implemented as stand-alone circuits, apparatuses, or devices, or as part of another system (e.g., integrated with other components, processors, etc.). The illustrated PLL device 100 in FIG. 1 is shown and described as having some digital components and some analog components. The digital portion 102 is described by a dashed outline. In an implementation, the circuits and circuit portions inside of the dashed line of digital portion 102 are digital components, and the circuits and circuit portions outside of the dashed line of digital portion 102 are analog components. This illustration is, however, for ease of discussion, and not intended to be limiting. The techniques and devices described herein with respect to frequency synthesizers, including PLL devices, is not limited to the block diagram illustrated in FIG. 1 or to a PLL device as shown, and may be applied to other types of frequency synthesizers (e.g., direct analog synthesizer, direct digital synthesizer, integer-N, fractional-N, digiphase synthesizer, etc.), or other PLL designs, without departing from the scope of the disclosure. In some cases, additional or alternative components may be used to implement the techniques described herein.

As shown in FIG. 1, a PLL device 100 generates (i.e., synthesizes) an output signal (e.g., clocking signal) $F_{OUT}$ based on an input signal 104. The output signal $F_{OUT}$ is also based on a reference frequency $F_{REF}$. For example, the input signal 104 determines a target frequency for $F_{OUT}$. A digitally controlled oscillator (DCO) 106, for example, generates the output signal $F_{OUT}$ at the target frequency, based on the input signal 104, after the input signal 104 is filtered by a digital loop filter 108, or the like. The output is also received by a frequency counter 110, for example, which is arranged to feed an error signal back to the input signal path.

If included, the frequency counter 110 receives the reference frequency $F_{REF}$, and generates the error signal based on a difference between the reference frequency $F_{REF}$ (or a product of the reference frequency $F_{REF}$ and a multiplier), and the output signal $F_{OUT}$. If the output signal $F_{OUT}$ is too low, with respect to the reference frequency $F_{REF}$ (or a product of the reference frequency $F_{REF}$ and a multiplier), then the error signal combines with the input signal 104 to increase the frequency output by the DCO 106. Alternately, the error signal combines with the input signal 104 to decrease the frequency output by the DCO 106 if it is too high, as measured by the frequency counter 110.

In some implementations, as shown in FIG. 1, portions of the DCO 106 and/or the frequency counter 110 may comprise digital components while other portions of the DCO 106 and/or the frequency counter 110 may comprise analog components. In alternate implementations, the entire DCO 106 and/or the entire frequency counter 110 may comprise digital components or analog components. In other implementations, other components, devices or systems may perform the described functions of the DCO 106 the digital loop filter 108, and/or the frequency counter 110.

In one implementation, the components of the PLL device 100 shown in FIG. 1 are arranged on a single integrated circuit (IC). In alternate implementations, one or more of the components of the PLL device 100 are arranged on multiple ICs or components.

In various implementations, one or more components of the PLL device 100 are implemented at least in part in hardware. For example, some components of the PLL device 100 may be implemented at least in part using accumulators, adders, flip-flops, inverters, and the like.

Example Spread Spectrum Modulation

Figure 2:
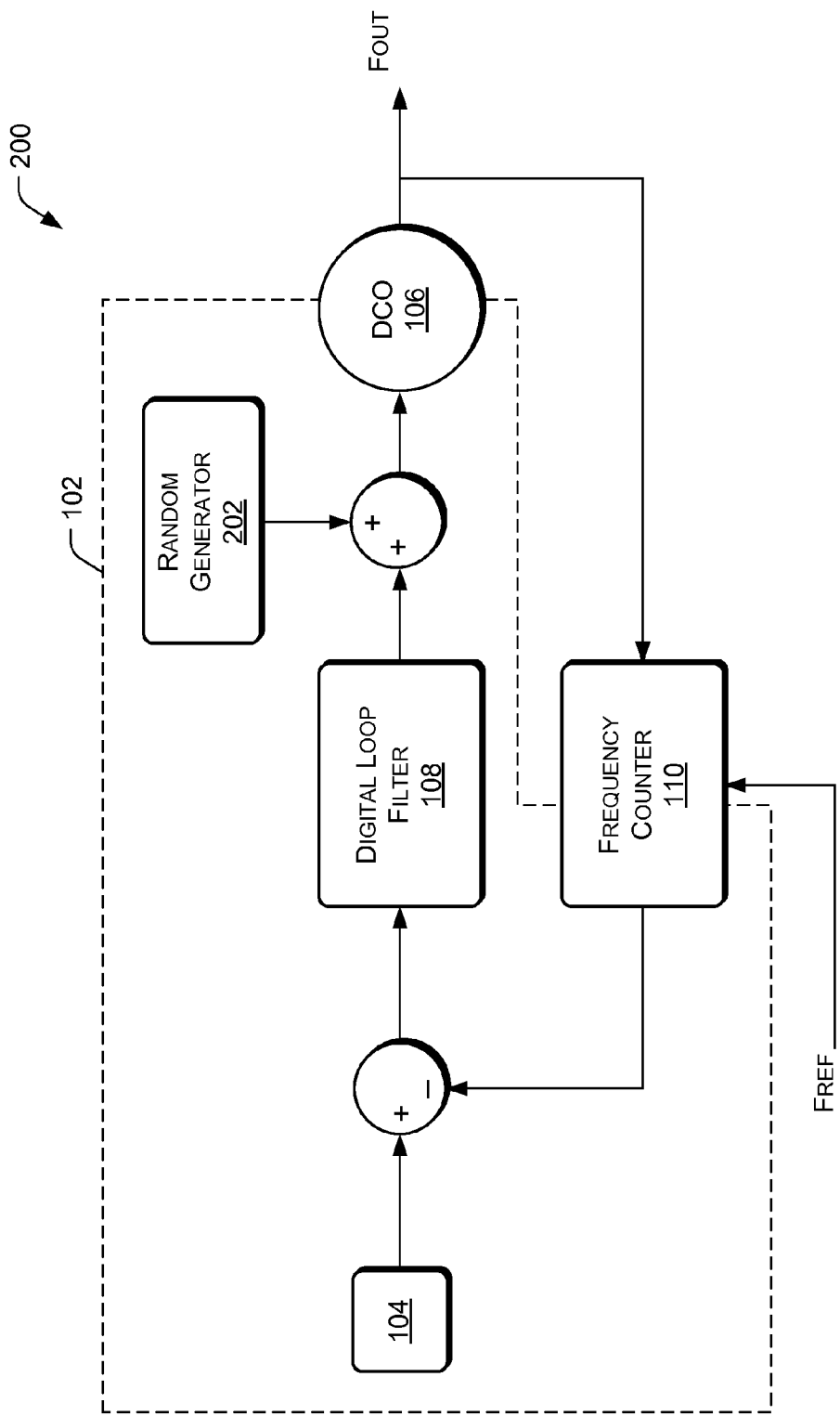
FIG. 2 is a block diagram of an example PLL, including a random generator, according to an implementation.

FIG. 2 is a block diagram of an example PLL device 200, including a random generator 202, according to an implementation. The PLL device 200 comprises the PLL device 100, as described above, and includes the random generator 202. In alternate implementations, the PLL device 200 includes additional or alternate components. In an implementation, as shown in FIG. 2, the random generator 202 comprises a digital device or component. In a particular implementation, the random generator 202 is a circuit fully digitally implemented. In alternate implementations, the random generator 202 comprises a partly or fully analog device or component.

In an implementation, the random generator 202 generates a sequence of values arranged to modulate the frequency of the clocking signal output from the PLL device 200, to form a spread spectrum clocking signal. For example, as shown in FIG. 2, the random generator 202 is arranged to inject the sequence of values onto the signal path of the PLL device 200. In one implementation, the sequence of values is added to the signal received by the DCO 106. In another implementation, the sequence of values is digitally added to the signal received by the DCO 106. The random generator 202 may comprise logic that enables the generator 202 to generate a sequence of values based on prior one or more values associated with one or more sequences of values. In addition or also, the logic of the random generator 202 may consider, when generating a sequence of values, one or more system (e.g., the PLL device 200) attributes. Such a system attribute may be instantaneous or accumulated jitter caused by the circuitry of the PLL device 200, crystal or other resonator thermal noise, internal or external traces, and the like.

Figure 3:
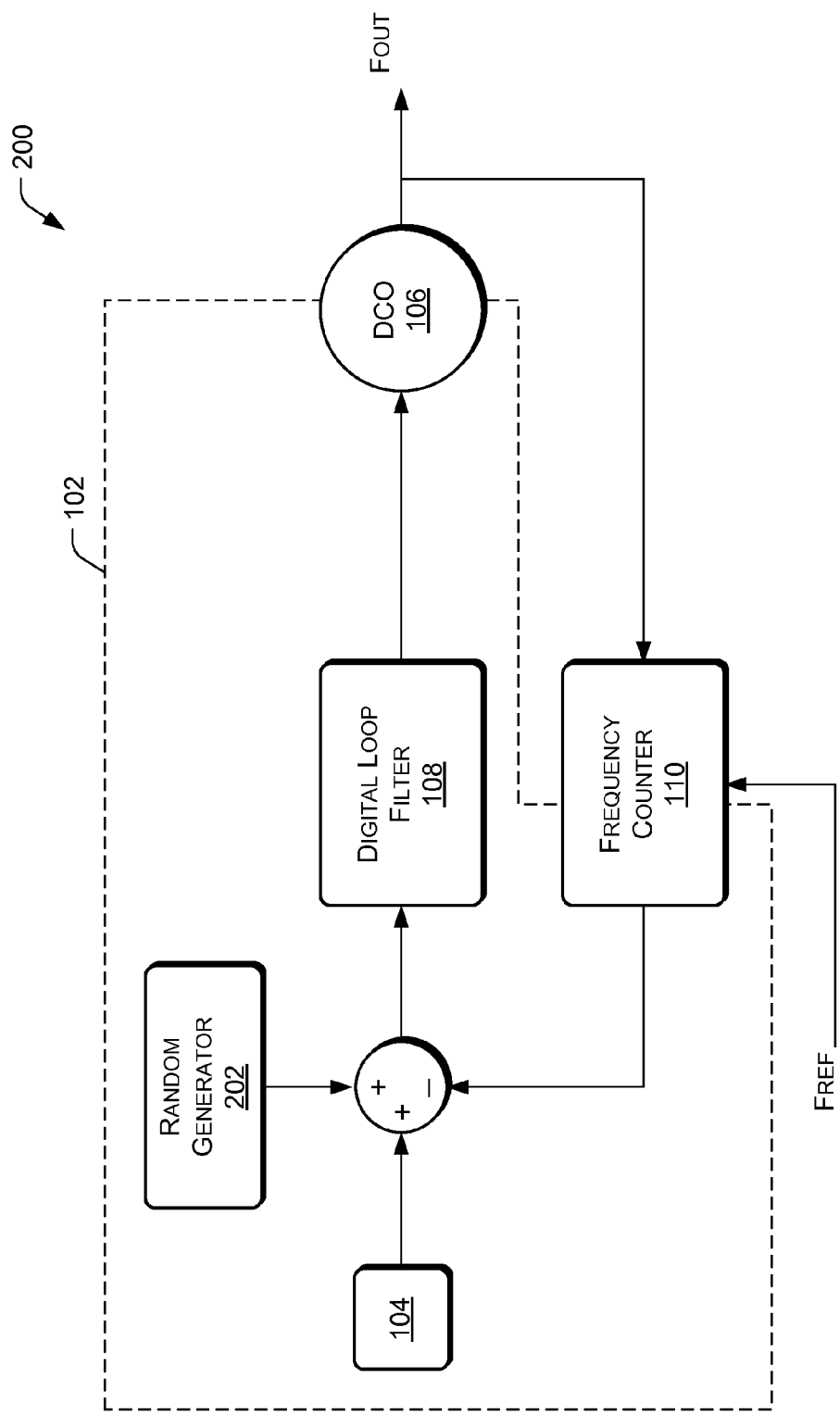
FIG. 3 is a block diagram of an example PLL, including a random generator, according to another implementation.

FIG. 3 is a block diagram of the example PLL device 200, including the random generator 202, according to another implementation. In the implementation shown in FIG. 3, the random generator 202 is also arranged to inject the sequence of values onto the signal path of the PLL device 200. However, in an implementation as shown in FIG. 3, the sequence of values is added to the input signal (e.g., combined with the input signal) prior to the digital loop filter 108. In a further implementation, the sequence of values is digitally added to the input signal prior to the digital loop filter 108.

The sequence of values modulates the output frequency of the PLL device 200, thus producing the spread spectrum effect on the energy of the clock signal. Modulating the output frequency spreads the energy over a wider bandwidth, and effectively reduces the peak spectrum electromagnetic emission.

In one implementation, the sequence of values comprises a sequence of random values (e.g., random numbers). A random modulation, i.e., modulation of the output of the PLL device 200 using random values generated by random generator 202, achieves a better spread of the clock signal energy spectrum than a periodic modulation, or modulation with a periodic signal. For instance, the clock signal energy is spread more evenly across a wide spectrum, with fewer distinct energy peaks. In one example, a random modulation allows a lower peak-peak modulation value to be used, reducing the maximum frequency for which the digital core is synthesized and leading to power and area savings in the digital core.

In another implementation, the sequence of values comprises a sequence of pseudo-random values. For example, in one instance, the sequence of values moves randomly between positive and negative frequency offsets of the nominal clocking frequency. In this instance, phase accumulation is reduced, thus improving the interoperability of synchronous interfaces with external systems and components.

In one implementation, the random generator 202 comprises a pseudo-random binary sequence (PRBS) generator. In another implementation, the PRBS generator has an arbitrary number of bits. For example, the number of bits of the PRBS generator may vary from implementation to implementation. In an implementation using an analog PLL device 200 or partly analog PLL device 200, the PRBS generator may include a conversion stage from a digital output to an analog output. In one case, the conversion stage may include one or more types of digital to analog converters.

In another implementation, the random generator 202 comprises a fully analog random generator. In an implementation using a partly or fully digital PLL device 200, the fully analog random generator may include a conversion stage, including one or more analog to digital converters.

In another implementation, the random generator 202 comprises a digital or analog chaotic map. For example, the chaotic map determines the random or pseudo-random values generated by the random generator. In a further implementation, the random generator 202 comprises one or more delta-sigma modulators of arbitrary order. For example, the order of the one or more delta-sigma modulators used may vary from implementation to implementation.

In an implementation, the sequence of random values (e.g., random numbers) modulates the frequency of the generated clocking signal output by the PLL device 200 at a frequency in the megahertz range. For example, the sequence of random numbers may modulate the clocking signal in a range comprising about 10 MHz to 40 MHz. In one implementation, the random generator 202 and one or more of the other components of the PLL device 200, are clocked by the reference frequency $F_{REF}$. In an example, the reference frequency $F_{REF}$ comprises a frequency in the range of about 10 MHz to 40 MHz. Clocking at a higher frequency such as this results in a much faster modulation of the clocking signal output by the PLL device 200 than generally occurs in the case of modulation using periodic signals such as triangular waveforms, and the like. For example, common modulation frequencies are often in the range of about 30 kHz to 33 kHz. In various implementations, phase accumulation is reduced due to the faster random modulation of the clocking signal output by the PLL device 200.

In an implementation, the spread spectrum clocking signal generated by the PLL device 200 due to modulating the synthesized clocking signal (i.e., the output of the DCO 106) is centered about the nominal frequency of the synthesized clocking signal. For example, the modulated signal is generally centered on the un-modulated signal, rather than being offset above or below the un-modulated signal. This is referred to as "center-spread" modulation, and generally alleviates the problem of constraining the digital core to a higher frequency. Additionally, a high-frequency center-spread modulation (in the MHz range) reduces the response time of the system when automatically responding to a safety issue.

Example Multi-Point Modulation Implementation

Figure 4:
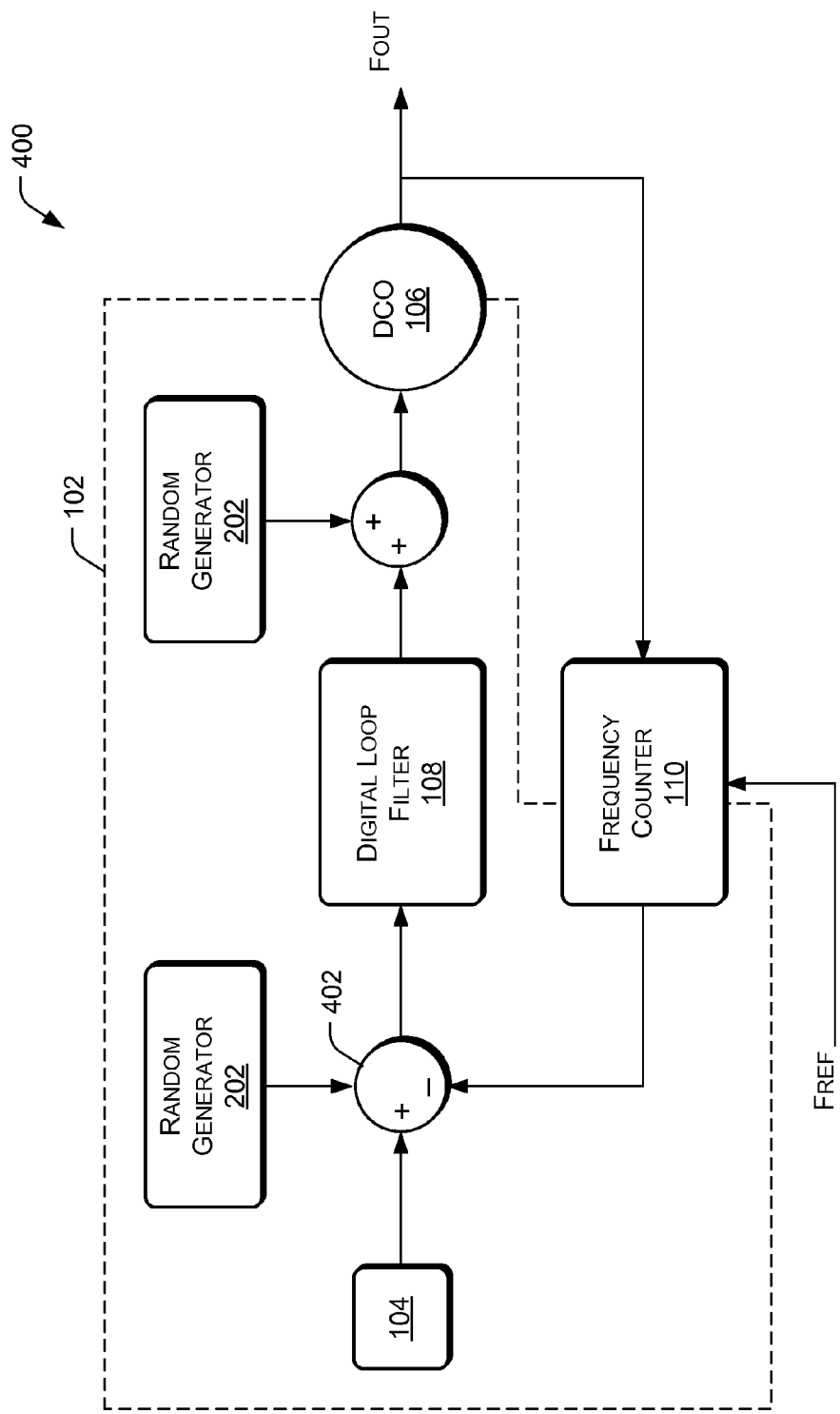
FIG. 4 is a block diagram of an example PLL, including two random generators, according to a further implementation.

FIG. 4 is a block diagram of an example PLL device 400, including two random generators 202, according to a further implementation. The PLL device 400 comprises the PLL device 200, as described above, and includes two or more random generators 202. In alternate implementations, the PLL device 400 includes additional or alternate components. In an implementation, as shown in FIG. 4, one or more of the random generators 202 comprises a digital device or component. In alternate implementations, one or more of the random generators 202 comprises a partly or fully analog device or component.

In an implementation, as shown in FIG. 4, a second value (e.g., random number) generator is arranged to generate a second sequence of values, and the second sequence of values is arranged to modulate the frequency of the clocking signal to form the spread spectrum clocking signal. In various implementations, one or both of the first and the second sequences of values comprise random or pseudo-random values.

In one implementation, as shown in FIG. 4, the PLL device 400 is arranged to synthesize the clocking signal based on an input signal 104, and the input signal 104 is modulated at least at two discrete points along a signal path of the apparatus. In alternate implementations, more than two random generators 202 may be used in a PLL device 400 for modulating the output signal to form a spread spectrum clocking signal. In various implementations, the sequences of values generated by the random generators 202 may be injected onto the signal path of the PLL device 400 at discrete locations, or they may be combined in various combinations prior to being injected onto the signal path of the PLL device 400 or combined with the input signal 104.

In further implementations, one or more sequences of values may be injected onto the signal path of the PLL device 400 (or combined with the input signal 104) at one or more locations of the signal path. For example, a PLL device 400 having one random generator 202 may inject the sequence of values generated by the random generator 202 at multiple locations along the signal path of the PLL device 400. In another example, a PLL device 400 having two or more random generators 400 may inject the sequences of values generated by the random generators 202 at more locations along the signal path of the PLL device 400 than there are random generators 202.

In one implementation, as shown in FIG. 4, a random sequence of values is injected in front of the DCO 106 as well as in front of a digital phase detector 402 (shown as a subtractor in the block diagram). In implementations having a digital loop filter 108, as shown in FIG. 4, one of the sequences of random values may be injected into a signal path of the electrical circuit ahead of the digital loop filter and the other of the sequences of random values may injected into the signal path of the electrical circuit after the digital loop filter. In another implementation, where an analog PLL device 400 is used, the second injection point may be at a feedback divider instead of at the phase detector. In alternate implementations, the sequences of values may be injected at different points along the signal path of the PLL device 400. In this type of architecture, "multi-point" modulation is performed, which can bring speed advantages in comparison to single-point modulation architecture.

Representative Process

Figure 5:
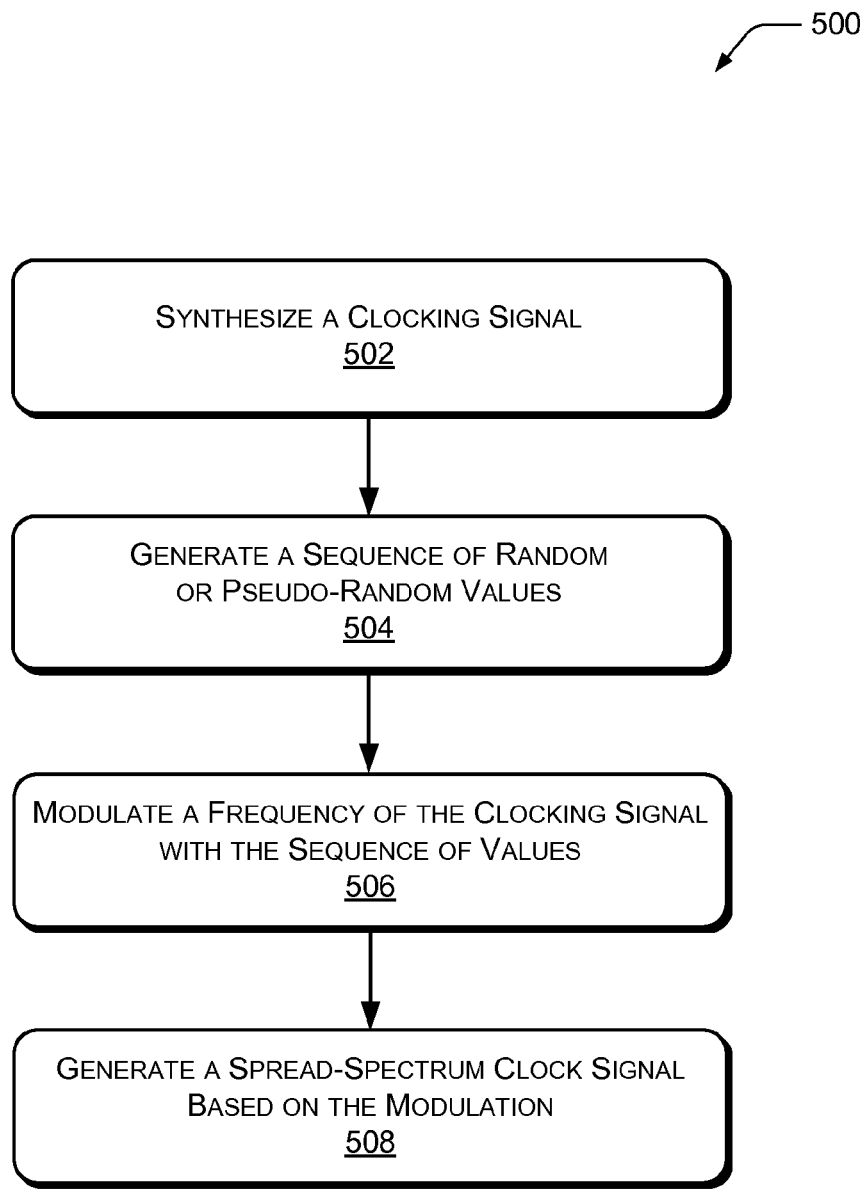
FIG. 5 is a flow diagram illustrating an example process for generating a spread spectrum clocking signal, according to an implementation.

FIG. 5 illustrates a representative process 500 for generating a spread spectrum clocking signal, according to an implementation. An example process 500 includes generating one or more sequences of values and modulating the output frequency of a frequency synthesizer with the sequence(s) of values. In various implementations, the sequence(s) of values may be random or pseudo-random. The process 500 is described with reference to FIGS. 1-4.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 502, the process includes synthesizing a clocking signal. For example, the clocking signal may be generated or synthesized by a digitally controlled oscillator (such as DCO 106), for example. In an implementation, the process includes receiving an input signal. In various implementations, the clocking signal may be generated based on the input signal (such as input signal 104, for example). The input signal may comprise a digital word, a voltage or current signal, a varying waveform, or the like. In an implementation, the clocking signal is generated based on the input signal and a reference frequency (such as reference frequency $F_{REF}$) or a multiple of the reference frequency.

At block 504, the process includes generating a sequence of random or pseudo-random values. For example, a digital, analog, or mixed signal component or circuit block (such as random generator 202) may generate a sequence of random or pseudo-random values or numbers.

In one implementation, the sequence of random or pseudo-random values comprises a sequence of positive and negative offsets of the nominal frequency of the clocking signal. For example, the sequence of values generated may be random, except for having alternating polarities. In other words, an example sequence may have a random positive number followed by a random negative number followed by a random positive number, and so forth. The values are offset from the nominal frequency of the generated clocking signal.

In another implementation, the sequence of random or pseudo-random values includes sets (e.g., pairs) of values comprising a random value followed by a value of the same magnitude having an opposite polarity. For example, the sequence may include a random number followed by the opposite polarity number, then a new random number followed by its opposite polarity number, and so forth. To illustrate, an example sequence may include: {6, −6, 33, −33, −12, 12, . . . } and so forth. In an implementation, these values are also offset from the nominal frequency of the generated clocking signal.

In one implementation, the sequence of values may be generated by tracking the values, and generating new values based on the tracking. For instance, a set of values may be generated and tracked, with the set of values being random or pseudo-random. The quantity of values that comprise a set may be arbitrary or preselected. After a set of values is generated and tracked, the next set of values may be generated based on an analysis or determination of the previous set. For example, in one implementation, the next set of values is generated based on a phase accumulation effect of a previous set of values. That is, if a previous set of values generated shows a tendency for phase accumulation, based on the nature of the values (mostly all positive values, for example), then a next set of values may be generated to compensate for the phase accumulation (e.g., a set comprising mostly negative values). In alternate implementations, other techniques may be applied to generate pseudo-random values based on tracking the values.

At block 506, the process includes modulating a frequency of the clocking signal with the sequence of random or pseudo-random values. In one implementation, the process includes injecting the random or pseudo-random values onto the signal path of the frequency synthesizer or adding (or combining, digitally adding, etc.) the random or pseudo-random values with the input signal to the frequency synthesizer.

At block 508, the process includes generating a spread spectrum clock signal based on the modulating. In one implementation, the process includes generating the spread spectrum clocking signal based on the input signal and the sequence of random or pseudo-random values. In other words, modulating the output signal of the frequency synthesizer results in a spread spectrum clock signal at the output of the frequency synthesizer.

In an alternate implementation, the process includes generating a second sequence of random or pseudo-random values and combining (digitally adding, for example) the second sequence of random or pseudo-random values to the input signal. The process further includes generating the spread spectrum clocking signal based on the input signal, a first sequence of random or pseudo-random values, and the second sequence of random or pseudo-random values. In other implementations, the process includes generating multiple sequences of random or pseudo-random values and generating the spread spectrum clocking signal based on the input signal and the multiple sequences of random or pseudo-random values.

In alternate implementations, other techniques may be included in the process 500 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An electrical circuit comprising:
   a digitally controlled oscillator (DCO) arranged to generate a clocking signal; and
   a random number generator arranged to generate a sequence of random values, the sequence of random values arranged to modulate a frequency of the clocking signal to form a spread spectrum clocking signal;
   a digital loop filter, wherein the sequence of random values is injected into a signal path of the electrical circuit prior to the digital loop filter; and
   a second random number generator arranged to generate a second sequence of values, the second sequence of values arranged to modulate the frequency of the clocking signal to form the spread spectrum clocking signal, the second random number generator being upstream from the digital loop filter.

2. The electrical circuit of claim 1, wherein the second sequence of values comprises random or pseudo-random values.

3. The electrical circuit of claim 1, wherein the second random number generator comprises an analog random generator.

4. The electrical circuit of claim 1, wherein one of the sequence of random values and the second sequence of values is injected into a signal path of the electrical circuit ahead of the digital loop filter and the other of the sequence of random values and the second sequence of values is injected into the signal path of the electrical circuit after the digital loop filter.

5. The electrical circuit of claim 1, further comprising a phase-locked loop (PLL) circuit, the PLL circuit including the DCO.

6. The electrical circuit of claim 1, wherein the sequence of random values is injected into a signal path of the electrical circuit ahead of the DCO.

7. The electrical circuit of claim 1, wherein the random number generator comprises a pseudo-random binary sequence (PRBS) generator.

8. The electrical circuit of claim 1, wherein the random number generator comprises a digital or analog chaotic map.

9. The electrical circuit of claim 1, wherein the random number generator comprises one or more delta-sigma modulators of arbitrary order.

10. The electrical circuit of claim 1, wherein the random number generator is a fully implemented digital circuit.

11. The electrical circuit of claim 1, wherein the random number generator comprises logic that enables generation of the sequence of values based on one or more values associated with one or more sequences of values.

12. The electrical circuit of claim 11, wherein the logic further enables generation of the sequence of values based on one or more attributes related to a system associated with the random number generator.

13. The electrical circuit of claim 1, wherein the sequence of random values is generated based on attributes associated with the electrical circuit.

14. The electrical circuit of claim 13, wherein the at least one of the attributes is instantaneous or accumulated jitter caused by the electrical circuit.

15. The electrical circuit of claim 1, further comprising a loop filter and another random number generator, the another random number generator to generate another sequence of random values for injection in a signal path preceding the loop filter and the random number generator to inject the sequence of random values in another signal path succeeding the loop filter.

16. An apparatus comprising:
a frequency synthesizer arranged to synthesize a clocking signal; and
a plurality of value generators each arranged to generate a sequence of values, each sequence of values arranged to modulate a frequency of the clocking signal to form a spread spectrum clocking signal, wherein a first of the plurality of value generators precedes a loop filter and a second of the plurality of value generators follows the loop filter, wherein each of the plurality of value generators is a separate random or pseudo-random signal generator.

17. The apparatus of claim 16, wherein the frequency synthesizer is arranged to synthesize the clocking signal based on an input signal, and wherein the input signal is modulated at least at two discrete points along a signal path of the apparatus.

18. The apparatus of claim 16, wherein the spread spectrum clocking signal is centered about a nominal frequency of the synthesized clocking signal.

19. The apparatus of claim 16, wherein the frequency synthesizer comprises one of a digital, analog, or mixed signal phase-locked loop (PLL) device.

20. A method comprising:
synthesizing a clocking signal;
generating a sequence of random or pseudo-random values;
generating a second sequence of random or pseudo-random values, the second sequence of random or pseudo-random values not derived from the sequence of random or pseudo-random values;
modulating a frequency of the clocking signal with the sequence of random or pseudo-random values and the second sequence of random or pseudo-random values; and
generating a spread spectrum clock signal based on the modulating.

21. The method of claim 20, further comprising:
receiving an input signal;
digitally adding the sequence of random or pseudo-random values to the input signal; and
generating the spread spectrum clocking signal based on the input signal, the sequence of random or pseudo-random values, and the second sequence of random or pseudo-random values.

22. The method of claim 20, further comprising:
receiving an input signal;
digitally adding the second sequence of random or pseudo-random values to the input signal; and
generating the spread spectrum clocking signal based on the input signal, the sequence of random or pseudo-random values, and the second sequence of random or pseudo-random values.

23. The method of claim 20, further comprising:
tracking the sequence of the random or pseudo-random values in sets of values; and
generating a next set of values based on a phase accumulation effect of a previous set of values.

24. The method of claim 20, wherein the sequence of random or pseudo-random values comprises a sequence of positive and negative offsets of a nominal frequency of the clocking signal.

25. The method of claim 20, wherein the sequence of random or pseudo-random values includes sets of values comprising a random value followed by a value of the same magnitude having an opposite polarity.

* * * * *